(12) United States Patent
Gentili et al.

(10) Patent No.: US 10,773,846 B2
(45) Date of Patent: Sep. 15, 2020

(54) ANVIL FOR TRANSVERSALLY SEALING A TUBE OF PACKAGING MATERIAL AND SEALING JAW HAVING AN ANVIL

(71) Applicant: Tetra Laval Holdings & Finance S.A., Pully (CH)

(72) Inventors: Luca Gentili, Ascoli Piceno (IT); Mauro Ferrari, Reggio Emilia (IT); Fabrizio Fenu, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/636,164

(22) PCT Filed: Jul. 30, 2018

(86) PCT No.: PCT/EP2018/070595
§ 371 (c)(1),
(2) Date: Feb. 3, 2020

(87) PCT Pub. No.: WO2019/025367
PCT Pub. Date: Feb. 7, 2019

(65) Prior Publication Data
US 2020/0172278 A1   Jun. 4, 2020

(30) Foreign Application Priority Data
Aug. 4, 2017 (EP) .................................. 17184954

(51) Int. Cl.
*B32B 37/00* (2006.01)
*B65B 51/30* (2006.01)
(Continued)

(52) U.S. Cl.
CPC .............. *B65B 51/30* (2013.01); *B29C 65/08* (2013.01); *B29C 65/7451* (2013.01);
(Continued)

(58) Field of Classification Search
USPC ....................................................... 156/580.1
See application file for complete search history.

(56) References Cited

U.S. PATENT DOCUMENTS 8,572,936 B2 * 11/2013 Mancin ................... B29C 65/02
53/548
9,545,751 B2 * 1/2017 Hull ........................ B65B 51/30
(Continued)

FOREIGN PATENT DOCUMENTS

| EP | 1066951 A2 | 1/2001 |
| EP | 1241098 A1 | 9/2002 |

(Continued)

OTHER PUBLICATIONS

Search Report and Written Opinion received in International Application No. PCT/EP2018/070595, dated Sep. 21, 2018, in 10 pages.
(Continued)

*Primary Examiner* — James D Sells
(74) *Attorney, Agent, or Firm* — Knobbe, Martens, Olson & Bear, LLP (57) ABSTRACT

An anvil for transversally sealing a tube having a longitudinal seam portion can include a first elongate contact surface and a second elongate contact surface. In some embodiments, the first elongate contact surface includes a first groove and the second elongate contact surface includes a second groove, each one of the first groove and the second groove being adapted to receive, in use, a respective section of the longitudinal seam portion of the tube. The first elongate contact surface can include a first seam interaction portion positioned within the first groove and having a first surface profile. The second elongate contact surface can include a second seam interaction portion positioned within (Continued)

the second groove and having a second surface profile. In some embodiments, the first surface profile differs from the second surface profile.

14 Claims, 7 Drawing Sheets

(51) Int. Cl.
    *B65B 51/22*     (2006.01)
    *B65B 9/20*     (2012.01)
    *B29C 65/00*     (2006.01)
    *B29C 65/08*     (2006.01)
    *B29C 65/74*     (2006.01)
    *B29L 31/00*     (2006.01)

(52) U.S. Cl.
    CPC .... *B29C 66/4312* (2013.01); *B29C 66/81433* (2013.01); *B29C 66/849* (2013.01); *B65B 9/20* (2013.01); *B65B 51/225* (2013.01); *B29L 2031/712* (2013.01)

(56) References Cited

U.S. PATENT DOCUMENTS 10,414,098 B2 *   9/2019   Aurand ............. B29C 66/43121
2018/0272620 A1 *   9/2018   Persson ................. B65B 51/225

FOREIGN PATENT DOCUMENTS

| JP | H11-43115 A | 2/1999 |
| WO | WO 2007/008131 A2 | 1/2007 |
| WO | WO 2016/132986 A1 | 8/2016 |

OTHER PUBLICATIONS

Search Report received in European Application No. 17184954, dated Jan. 22, 2018, in 6 pages.

* cited by examiner

ANVIL FOR TRANSVERSALLY SEALING A TUBE OF PACKAGING MATERIAL AND SEALING JAW HAVING AN ANVIL

TECHNICAL FIELD

The present invention relates to an anvil for transversally sealing a tube, in particular a tube of packaging material.

The present invention also relates to a sealing jaw having an anvil for transversally sealing a tube, in particular a tube of packaging material.

BACKGROUND ART

As is known, many liquid or pourable food products, such as fruit juice, UHT (ultra-high-temperature treated) milk, wine, tomato sauce, etc., are sold in packages made of sterilized packaging material.

A typical example is the parallelepiped-shaped package for liquid or pourable food products known as Tetra Brik Aseptic (registered trademark), which is made by sealing and folding laminated strip packaging material. The packaging material has a multilayer structure comprising a base layer, e.g. of paper, covered on both sides with layers of heat-seal plastic material, e.g. polyethylene. In the case of aseptic packages for long-storage products, such as UHT milk, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Packages of this sort are normally produced on fully automatic packaging apparatus, which advance a web of packaging material through a sterilization unit of the packaging apparatus for sterilizing the web of packaging material, e.g. by means of chemical sterilization (e.g. by applying a chemical sterilizing agent, such as a hydrogen peroxide solution) or physical sterilization (e.g. by means of an electron beam). Then, the sterilized web of packaging material is maintained and advanced within an isolation chamber (a closed and sterile environment), and is folded and sealed longitudinally to form a tube having a longitudinal seam portion, which is further fed along a vertical advancing direction.

In order to complete the forming operations, the tube is continuously filled with a sterilized or sterile-processed pourable food product, and is transversally sealed and subsequently cut along equally spaced transversal cross sections within a package forming unit of the packaging apparatus during advancement along the vertical advancing direction.

Pillow packages are so obtained within the packaging apparatus, each pillow package having a longitudinal sealing band, a top transversal sealing band and a bottom transversal sealing band.

In more detail, the package forming unit comprises a plurality of forming and sealing assemblies, each one, in use, forming and transversally sealing the tube so as to obtain the single packages. In particular, each forming and sealing assembly also transversally cuts the tube between two successive packages after or during the transversal sealing.

Each forming and sealing assembly comprises a sealing jaw for transversally sealing the tube for obtaining a respective transversal seal portion by locally compressing the tube and heating the heat-seal packaging material.

Different types of sealing jaws are known, which operate by means of induction or by ultrasound, in particular for heating the layers of heat-seal plastic material.

Sealing jaws which heat by means of ultrasound comprise an ultrasonic horn and an anvil, which, in use, compress the tube in cooperation with one another and by activation of the ultrasonic horn the heat-seal plastic material is heated and consequently melted so as to form the sealed transversal seal portion.

A typical anvil comprises a first ridge and a second ridge extending along respectively a first axis and a second axis and being arranged upon one another.

The anvil also comprises an elongated through-seat arranged between the first ridge and the second ridge for housing a cutting blade, which is adapted to transversally cut the tube along the transversal seal portion so as to define transversal sealing bands of the final packages. In other words, the cutting blade cuts, in use, the seal portion between a first sealing band and a second sealing band, which are substantially defined by respectively a first interaction surface and a second interaction surface of the anvil. The first sealing band being upstream of the second sealing band along the advancement path of the tube.

The first ridge and the second ridge respectively comprise the first interaction surface and the second interaction surface for contacting the tube.

Furthermore, the first interaction surface and the second interaction surface comprise respectively a first groove and a second groove each one adapted to receive a respective section of the longitudinal seam portion of the tube.

The first ridge and the second ridge also each comprises respectively the first interaction seam portion and the second interaction seam portion provided within respectively the first groove and the second groove each one, in use, interacting with a respective section of the longitudinal seam portion.

In particular, the first interaction seam portion and the second interaction seam portion are formed by three hemispheres for exerting in conjunction with the ultrasonic horn a local sealing pressure onto the respective section of the seam portion.

Even though the sealing jaws currently in use provide an efficient transversal sealing, a need is felt for further improvement.

DISCLOSURE OF INVENTION

It is therefore an object of the present invention to provide, in a straightforward and low-cost manner, an improved anvil.

It is a further object of the present invention to provide, in a straightforward and low-cost manner, an improved sealing jaw.

According to the present invention, there is provided an anvil as claimed in claim 1.

Furthermore, according to the present invention, there is provided a sealing jaw as claimed in claim 12.

Further advantageous embodiments of the anvil and the sealing jaw according to the invention are specified in the dependent claims.

BRIEF DESCRIPTION OF THE DRAWINGS

A non-limiting embodiment of the present invention will be described by way of example with reference to the accompanying drawings, in which.

BEST MODES FOR CARRYING OUT THE INVENTION

Figure 1:
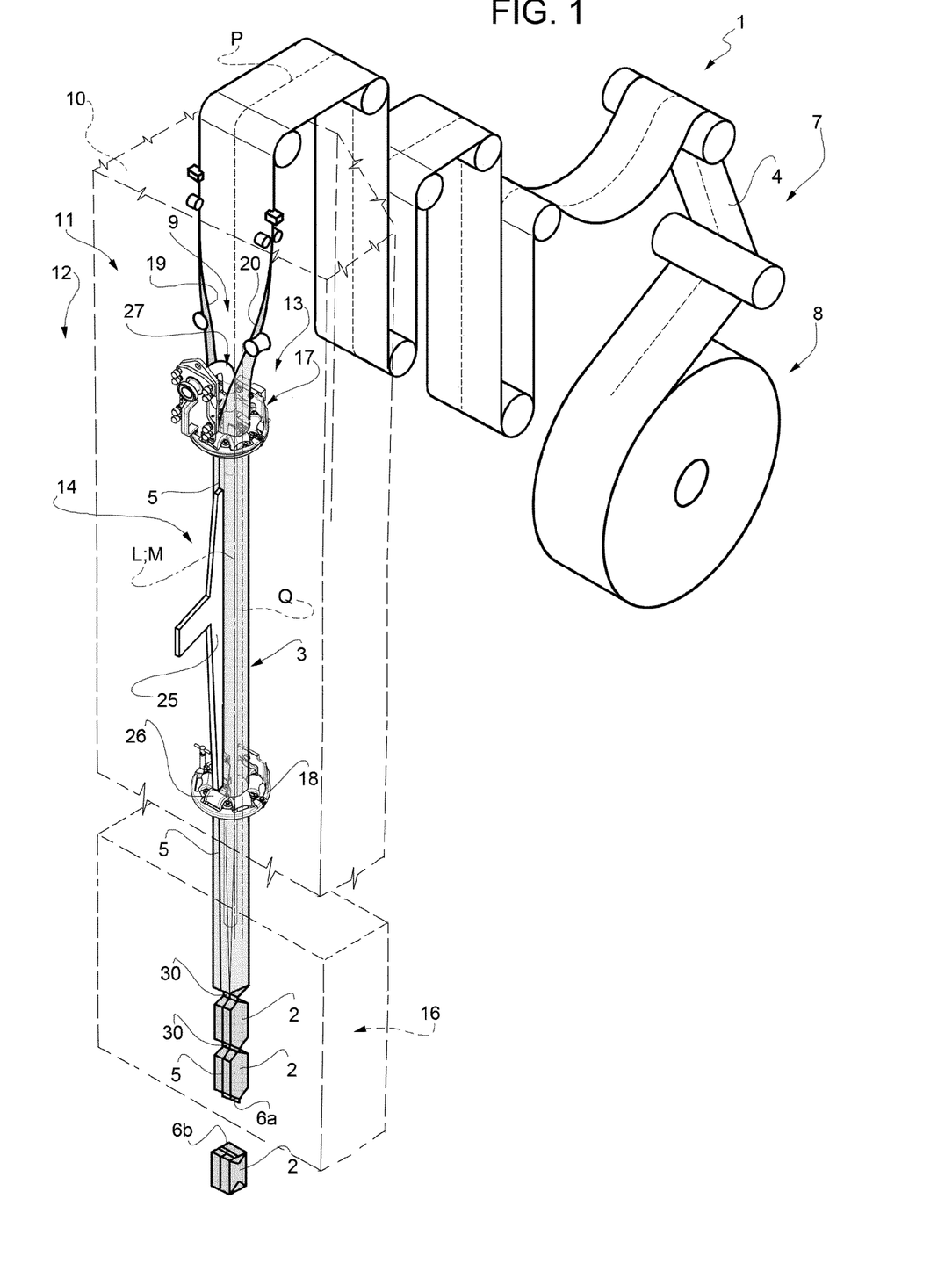
FIG. 1 is a schematic view of a packaging apparatus for packaging a pourable product, with parts removed for clarity.

Number 1 indicates as a whole a packaging apparatus for producing sealed packages 2 of a pourable food product, such as pasteurized milk, fruit juice, wine, tomato sauce, etc., from a tube 3 of a web 4 of packaging material. In particular, in use, tube 3 extends along a longitudinal axis L, in particular, axis L having a vertical orientation.

Web 4 of packaging material has a multilayer structure (not shown), and comprises a layer of fibrous material, normally paper, covered on both sides with respective layers of heat-seal plastic material, e.g. polyethylene.

Preferably, web 4 also comprises a layer of gas- and light-barrier material, e.g. aluminum foil or ethylene vinyl alcohol (EVOH) film, and at least a first and a second layer of heat-seal plastic material. The layer of gas- and light-barrier material is superimposed on the first layer of heat-seal plastic material, and is in turn covered with the second layer of heat-seal plastic material. The second layer of heat-seal plastic material forms the inner face of package 2 eventually contacting the food product.

A typical package 2 obtained by packaging apparatus 1 comprises a longitudinal seam portion 5 and a pair of transversal sealing bands, in particular a transversal top sealing band 6a and a transversal bottom sealing band 6b. In particular, sealing band 6a is arranged upstream of sealing band 6b along a tube advancement path Q. It must be noted, that sealing band 6a is associated to one respective package 2 and sealing band 6b is associated to another respective package 2. The respective packages 2 being connected to one another prior to cutting between the respective sealing band 6a and the respective sealing band 6b and being divided from one another after cutting between the respective sealing band 6a and the respective sealing band 6b.

With particular reference to FIG. 1, packaging apparatus 1 comprises:

conveying means 7 for advancing in a known manner web 4 along its longitudinal axis along a web advancement path P from a delivery station 8 to a forming station 9, at which, in use, the web 4 is formed into tube 3;

an isolation chamber 10 having an inner environment 11, in particular an inner sterile environment 11, containing a sterile gas, in particular sterile air, and being separated from an outer environment 12;

a tube forming device 13 extending along a longitudinal axis M, in particular having a vertical orientation, and being arranged, in particular at station 9, at least partially, preferably fully, within isolation chamber 10 and being adapted to form tube 3 from the, in use, advancing web 4;

a sealing device 14 at least partially arranged within isolation chamber 10 and being adapted to longitudinally seal tube 3 formed by tube forming device 13 so as to form longitudinal seam portion 5;

filling means for continuously filling tube 3 with the pourable product; and a package forming unit 16 adapted to form, to transversally seal and to transversally cut the, in use, advancing tube 3 for forming packages 2.

Preferably, packaging apparatus 1 also comprises a sterilizing unit (not shown and known as such) adapted to sterilize the, in use, advancing web 4 at a sterilization station, in particular the sterilization station being arranged upstream of forming station 9 along path P.

Preferentially, conveying means 7 are adapted to advance tube 3 and any intermediate of tube 3 in a manner known as such along path Q, in particular from forming station 9 to package forming unit 16. In particular, with the wording intermediates of tube 3 any configuration of web 4 is meant prior to obtaining the tube structure and after folding of web 4 by tube forming device 13 has started. In other words, the intermediates of tube 3 are a result of the gradual folding of web 4 so as to obtain tube 3, in particular by overlapping with one another a first edge 19 of web 4 and a second edge 20 of web 4, opposite to first edge 19.

In more detail, tube forming device 13 defines, in use, axis L of tube 3, in particular axes L and axis M being parallel to one another.

Preferentially, tube forming device 13 comprises at least two forming ring assemblies 17 and 18, in particular arranged within isolation chamber 10, being adapted to fold in cooperation with one another web 4 gradually into tube 3, in particular by overlapping edges 19 and 20 with one another for forming seam portion 5 of tube 3. In the specific case shown, forming ring assembly 18 being arranged downstream of forming ring assembly 17 along path Q.

In particular, each one of forming ring assemblies 17 and 18 substantially lies within a respective plane, in particular each plane being orthogonal to axis M, even more particular each respective plane having a substantially horizontal orientation.

Even more particular, forming ring assemblies 17 and 18 are spaced apparat from and parallel to one another (i.e. the respective planes are parallel to and spaced apart from one another).

Preferentially, each plane is orthogonal to axis M and to axis L.

In further detail, sealing device 14 comprises a sealing head 25 adapted to interact with tube 3, in particular with seam portion 5 for longitudinally sealing tube 3. In particular, sealing head 25 is adapted to heat tube 3, in particular along seam portion 5. Sealing head 25 can be of any known kind. In particular, sealing head 25 can be of the kind operating by means of induction heating or by a stream of heat or by means of ultrasound or other means.

Preferentially, sealing device 14 also comprises a pressuring assembly (only partially shown) adapted to exert a mechanical force on tube 3, in particular on the substantially overlapping edges 19 and 20, even more particular onto seam portion 5 of tube 3 so as to ensure sealing of tube 3 along seam portion 5.

In particular, the pressuring assembly comprises at least an interaction roller 26 and a counter-interaction roller (not shown) adapted to exert the mechanical force onto seam portion 5 from opposite sides thereof. In particular, in use, seam portion 5 of tube 3 is interposed between interaction roller 26 and the counter-interaction roller.

Preferentially, the interaction roller 26 is supported by forming ring assembly 18.

With particular reference to FIG. 1, the filling means comprise a filling pipe 27 being in fluid connection with a pourable product storage tank (not shown and known as such), which is configured to store/provide the pourable product to be packaged.

In particular, filling pipe 27 is adapted to direct, in use, the pourable product into tube 3.

Preferentially, filling pipe 27 is, in use, at least partially placed within tube 3 for continuously feeding the pourable product into tube 3.

Figure 2:
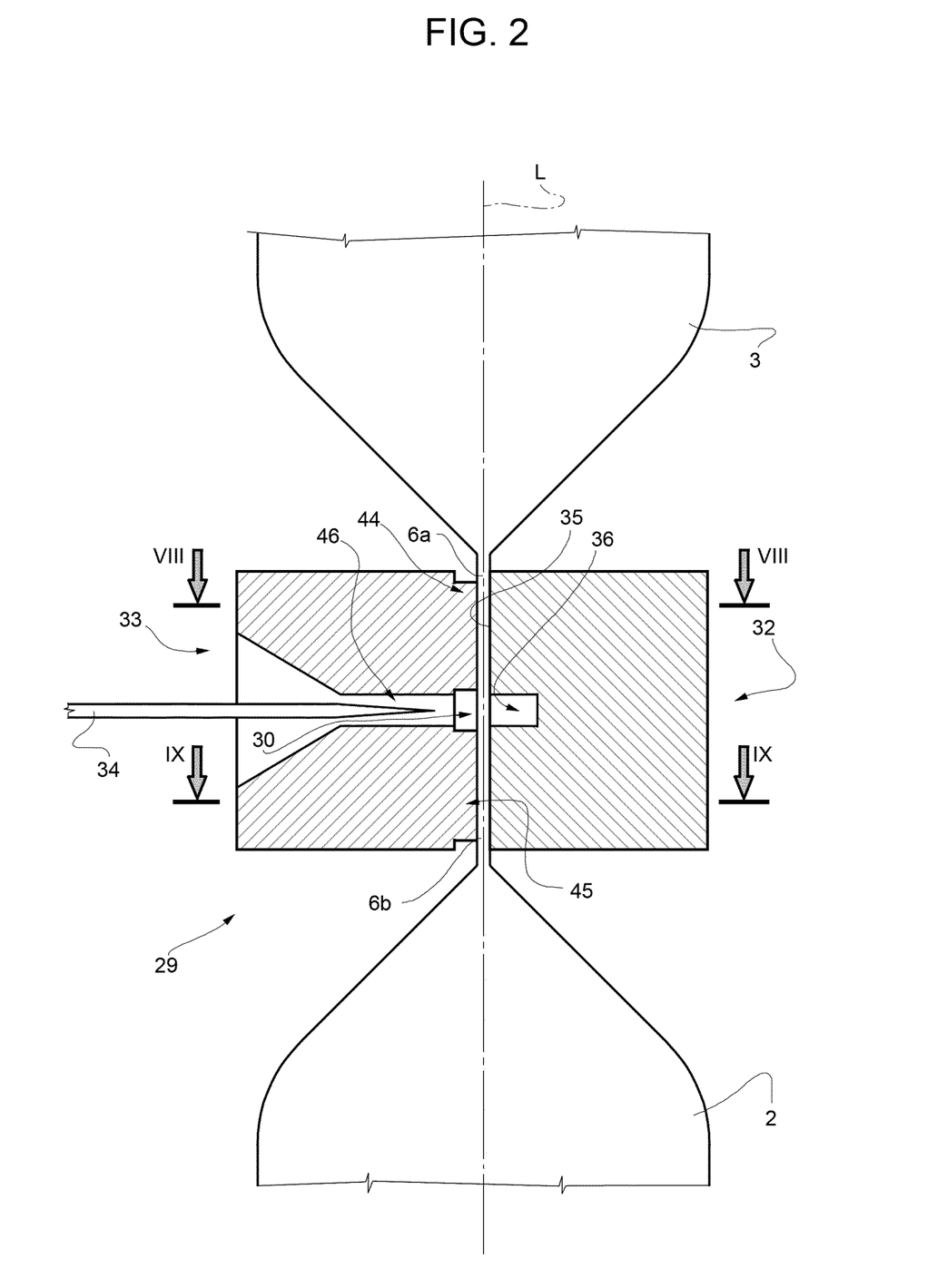
FIG. 2 is a schematic sectional side view of a detail of the packaging apparatus of FIG. 1 having an anvil according to the present invention, with parts removed for clarity.
Figure 3:
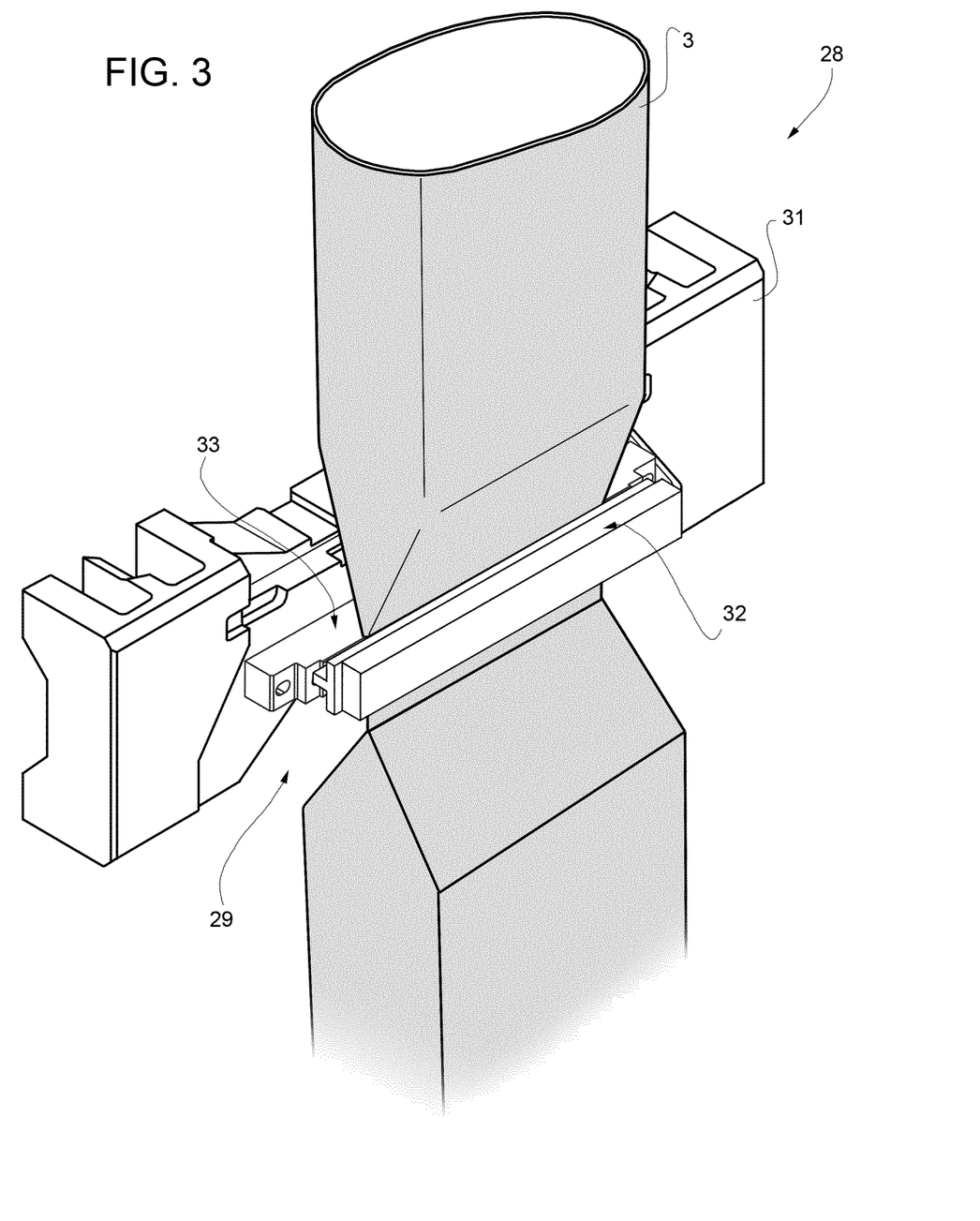
FIG. 3 is a perspective top-side view of the detail of FIG. 2, with parts removed for clarity.

With reference to FIGS. 1 to 3, package forming unit 16 comprises:
  a plurality of forming and sealing assemblies 28 (only partially shown to the extent necessary for the comprehension of the present invention), each one adapted to form (shape) tube 3 and to transversally seal tube 3, in particular between two successive packages 2; and
  a conveying device (not shown and known as such) that advances each one of the forming and sealing assemblies 28 at least during forming and transversal sealing of tube 3 parallel to path Q.

In more detail, each forming and sealing assembly 28 comprises:
  a forming shell (not shown and known as such) being adapted to define at least partially the shape of packages 2; and
  a sealing jaw 29 adapted to at least transversally compress, in particular flat-lay and squeeze, and to transversally seal tube 3 during advancement along path Q for obtaining a transversal seal portion 30.

Preferably, each assembly 28 also comprises a support structure (only partially shown in FIG. 3 to the extent necessary for the comprehension of the invention) adapted to support the respective forming shell and the respective sealing jaw 29.

In further detail, each forming shell comprises at least a first half-shell (not shown and known as such) and a second half-shell (not shown and known as such) being adapted to define in cooperation at least partially the shape of packages 2. In particular, the first half-shell and the second half-shell are adapted to contact tube 3 from opposite sides thereof.

The support structure comprises a first support member 31 carrying the first half-shell and a second support member (not shown and known as such) carrying the second half-shell. In particular, the first half-shell is moveably mounted to the first support member 31 and the second half-shell is moveably mounted to the second support member. Even more particular, the first half-shell and the second half-shell are moveably mounted to respectively the first support member 31 and the second support member so as to simultaneously move between a respective open configuration, at which the first half-shall and the second half-shell are, in use, detached from tube 3, and a respective closed configuration, at which the first half-shell and the second half-shell are adapted to shape tube 3.

With particular reference to FIGS. 2 and 3, each sealing jaw 29 comprises:
  an ultrasonic horn 32 (or sonotrode) for subjecting seal portion 30 to ultrasonic vibrations, in particular for melting the heat-seal plastic material along transversal seal portion 30; and
  an anvil 33 for compressing in cooperation with ultrasonic horn 32 tube 3 for forming seal portion 30, in particular by locally flat-laying and squeezing tube 3.

Preferentially, each anvil 33 is adapted to transversally seal in cooperation with the respective ultrasonic horn 32 tube 3, in particular for obtaining two successive packages 2.

In particular, in use, tube 3 is interposed between ultrasonic horn 32 and anvil 33. Even more particular, each anvil 33 and the respective ultrasonic horn 33 are adapted to contact tube 3 from opposite sides thereof.

In particular, each anvil 33 and the respective ultrasonic horn 32 are configured to provide in cooperation with one another for application of the required pressure profile acting on the respective seal portion 30 during the transversal sealing process.

Furthermore, each forming and sealing assembly 28, in particular the respective sealing jaw 29, is adapted to transversally cut tube 3, in particular between two successive packages 2 even more particular along the respective seal portion 30.

Preferentially, each forming and sealing assembly 28, in particular the respective sealing jaw 29, also comprises cutting means, in particular a cutting blade 34, for transversally cutting seal portion 30.

In an alternative embodiment not shown, cutting means, in particular cutting blades 34, are separate from forming and sealing assemblies 28, in particular from the sealing jaws 29.

It must be noted, that each seal portion 30 comprises sealing bands 6a and 6b.

Preferably, cutting means, in particular cutting blade 34 are adapted to cut the respective seal portion 30 between sealing band 6a and sealing band 6b.

In other words, the respective sealing bands 6a and 6b are, in use, prior to activation of the cutting means joined to one another and become separated from one another during activation of the cutting means, in particular cutting blade 34.

Preferentially, each ultrasonic horn 32 is coupled, in particular mounted, to the support structure, in particular the respective second support member; and each anvil 33 is coupled, in particular mounted, to the support structure, in particular the respective first support member 31.

Each forming and sealing assembly 28, in particular the respective sealing jaw 29, also comprises a control assembly (not shown) adapted to control the respective sealing jaw 29 itself between a sealing configuration and a rest configuration. In particular, each control assembly is adapted to control the respective sealing jaw 29 between the respective sealing configuration and the respective rest configuration by cooperation with a cam mechanism (not shown) of packaging apparatus 1.

In particular, the respective control assembly is adapted to control the respective ultrasonic horn 32 and the respective anvil 33 between a respective sealing position at which the respective ultrasonic horn 32 and the respective anvil 33 are configured to compress and to transversally seal tube 3 so as to form seal portion 30 and a respective rest position at which the ultrasonic horn 32 and the anvil 33 are detached from tube 3.

In particular, each control assembly is adapted to move the respective anvil 33 and the respective ultrasonic horn 32 towards one another for controlling the respective ultrasonic horn 32 and the respective anvil 33 into their respective sealing position; and to withdraw the respective ultrasonic horn 32 and the respective anvil 33 from one another for controlling the respective ultrasonic horn 32 and the respective anvil 33 into their respective rest position.

Preferentially, the respective control assembly is also adapted to control the respective first half-shell and the respective second half-shell between the respective open configuration and the respective closed configuration.

In more detail, each ultrasonic horn 32 comprises an abutment surface 35 extending along a respective extension axis for contacting tube 3 (and seal portion 30) and a mechanical vibration generator (not shown and known as such) so as to generate the ultrasound waves.

In particular, the mechanical vibration generator comprises one or more piezoelectric elements supplied with an alternating voltage for generating the mechanical vibrations in the ultrasound regime.

Preferably, ultrasonic horn 32 comprises a recess 36 being adapted to at least partially receive cutting blade 34. In particular, recess 36 extends parallel to the extension axis of abutment surface 35.

With particular reference to FIGS. 4 to 7 each anvil 33 comprises:
- at least a first ridge 44 extending along an axis B; and
- at least a second ridge 45 extending along an axis C, axis C being parallel to axis B.

Figure 4:
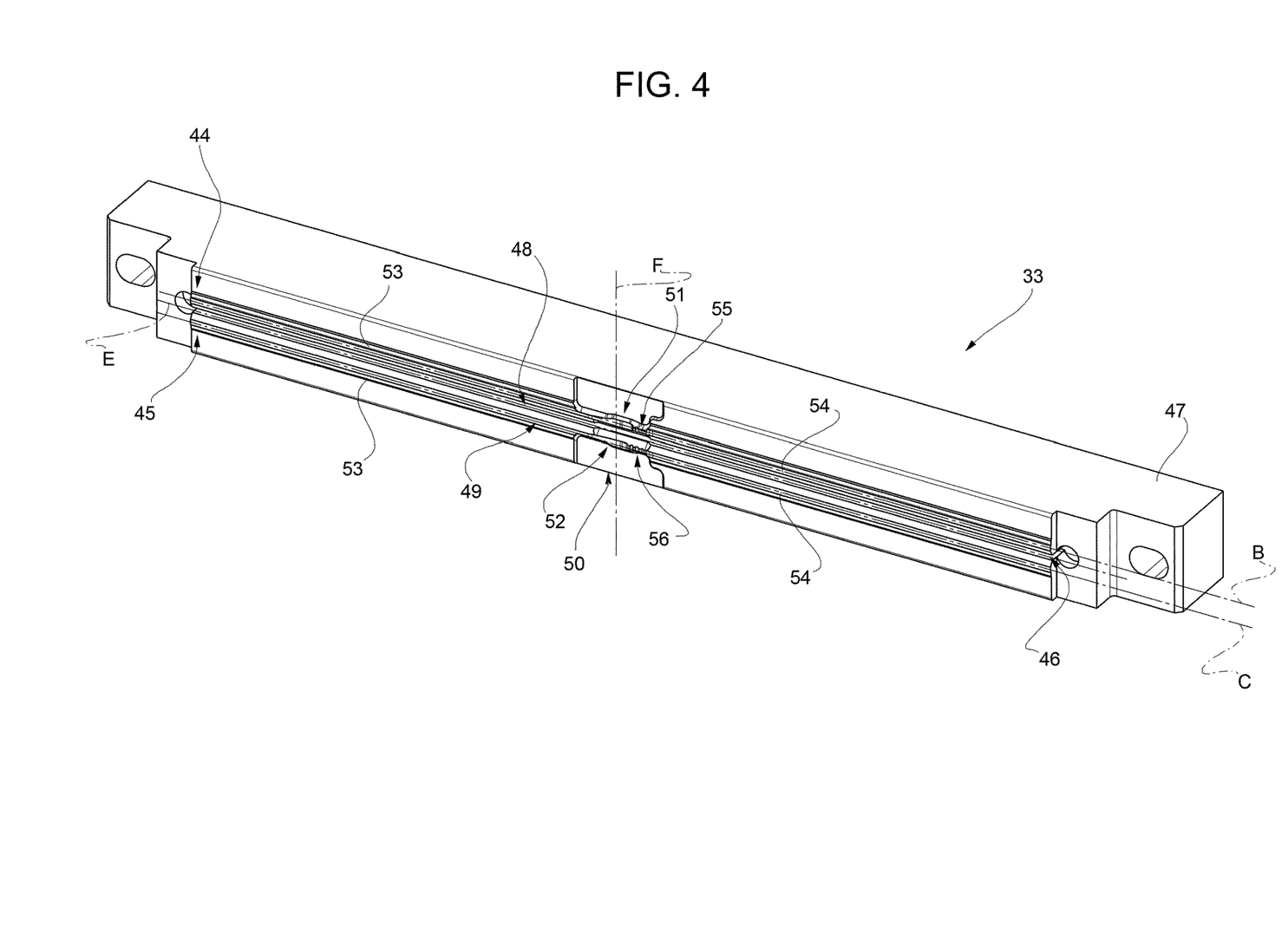
FIG. 4 is a perspective top-side view of the anvil according to the present invention, with parts removed for clarity.

In particular, in use, ridge 44 is arranged upstream of ridge 45 along path Q. Even more particular, in use, ridge 44 is arranged above ridge 45.

Preferentially, axis B and axis C are transversal, in particular perpendicular to axis L.

Preferably, axis B and axis C are parallel to the extension axis of abutment surface 35.

In further detail, each anvil 33 also comprises an elongated through-seat 46 extending along a third axis E being parallel to the respective axis B and the respective axis C and being adapted to house cutting blade 34 and being interposed between ridge 44 and ridge 45.

Preferably, anvil 33 also comprises a base body 47 carrying ridge 44 and ridge 45.

Preferentially, base body 47, ridge 44 and ridge 45 are constructed as a single piece.

Advantageously, anvil 33, in particular ridge 44, comprises at least an elongate contact surface 48 extending along axis B and being adapted to interact with, in particular to locally contact, in use, tube 3; and anvil 33, in particular ridge 45, comprises an elongate contact surface 49 being spaced apparat from the respective elongate contact surface 48, extending along axis C parallel to axis B and being adapted to interact with, in particular to locally contact, in use, tube 3.

In particular, in use, each contact surface 48 locally contacts tube 3 such to substantially define the respective sealing band 6a of the respective seal portion 30, in particular in cooperation with the respective ultrasonic horn 32, and each contact surface 49 locally contacts tube 3 such to substantially define the respective sealing band 6b of the respective seal portion 30, in particular in cooperation with the respective ultrasonic horn 32.

Advantageously, each anvil 33 also comprises a recess 50 extending along an axis F transversal, in particular perpendicular, to the respective axis B and the respective axis C and being adapted to receive, in use, a section of longitudinal seam portion 5 of tube 3. In particular, recess 50 allows to receive the section of longitudinal seam portion 5 as, in use, when anvil 33 cooperates with ultrasonic horn 32 to form seal portion 30, three packaging material layers (three-layer arrangement) are compressed in the area of seam portion 5 and two packaging material layers (two-layer arrangement) are compressed in the areas distinct from seam portion 5 (in particular, see FIGS. 8 and 9). This is in particular due to the overlap of web 4, in particular edge 19 and edge 20.

Overall, this results in changes of the local thickness. In other words, each recess 50 has the purpose of compensating for the changes of the local thickness.

As well, it must be noted, that as a result of the two-layer arrangement and the three-layer arrangement there are steps present between the two-layer arrangement and the three-layer arrangement. One of these steps being arranged on the outer surface of tube 3, i.e. of the respective package 2.

In further detail, each contact surface 48 comprises a respective groove 51 and each contact surface 49 comprises a respective groove 52, each one extending along axis F.

Figure 8:
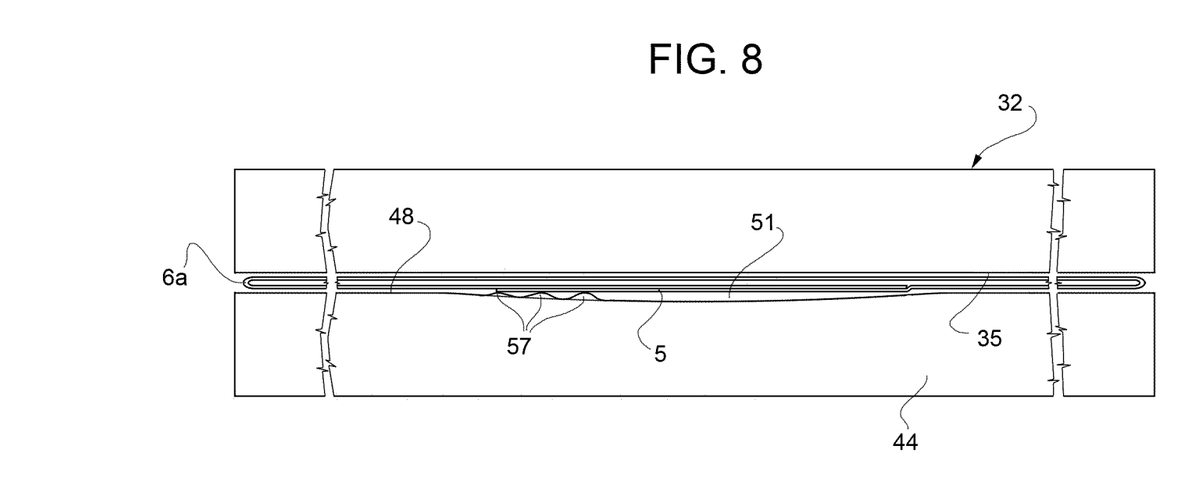
FIG. 8 is a sectional view along line VIII-VIII of FIG. 2, with parts removed for clarity.
Figure 9:
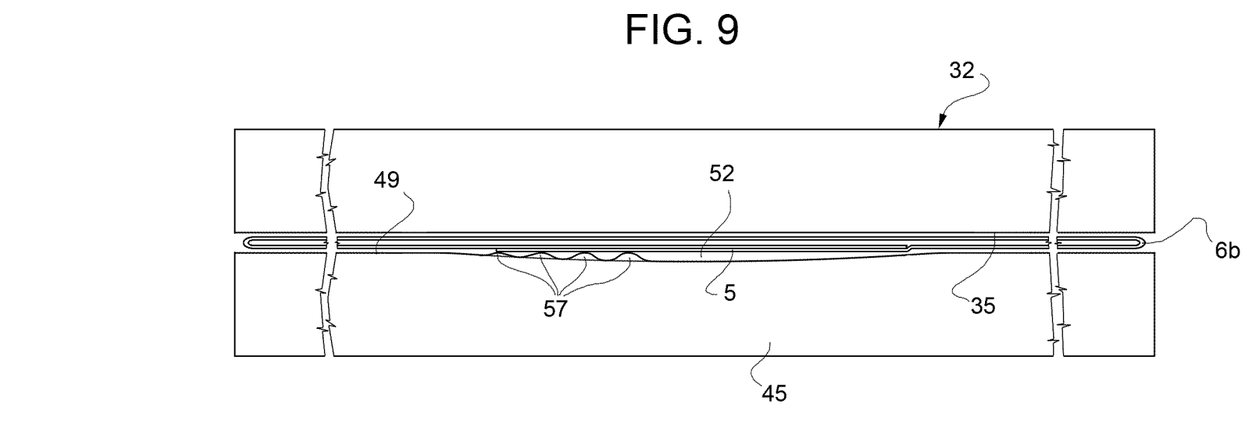
FIG. 9 is a sectional view along line IX-IX of FIG. 2, with parts removed for clarity.

Preferentially, each one of grooves 51 and each one of grooves 52 being adapted to receive, in use, a respective section of seam portion 5 of tube 3 (in particular, see FIGS. 8 and 9). In particular, each groove 51 and each groove 52 at least partially define in cooperation the respective recess 50.

Preferably, each contact surface 48 and each contact surface 49 comprise a respective first auxiliary portion 53 and a respective second auxiliary portion 54 with respectively the respective groove 51 or the respective groove 52 being interposed between the respective first auxiliary portion 53 and the respective second auxiliary portion 54.

Furthermore, each contact surface 48 comprises a respective seam interaction portion 55 being adapted to interact with, in particular to locally contact, in use, the respective section of seam portion 5; and each contact surface 49 comprises a respective seam interaction portion 56 being adapted to interact with, in particular to locally contact, in use, the respective section of seam portion 5.

Furthermore, each seam interaction portion 55 and each seam interaction portion 56 have a respective surface profile. In particular, the respective surface profile extends parallel to axis B and axis C, respectively.

In particular, each seam interaction portion 55 and each seam interaction portion 56 are configured such to define a local pressure profile acting on the respective local section of seam portion 5, which is needed for obtaining a secure sealing of seal portion 30, in particular the respective sealing bands 6a and 6b. Even more particular, each seam interaction portion 55 and each seam interaction portion 56 are designed so as to provide different local pressure profiles with respect to the respective sealing bands 6a and 6b. In particular, the respective surface profile of each seam interaction portion 55 and the respective surface profile of each seam interaction portion 56 are designed such that the pressure profile acting on the respective sealing band 6a is different from the pressure profile acting on the respective sealing band 6b.

Preferentially, each seam interaction portion 53 and each seam interaction portion 54 are designed such to compensate for the, in use, occurring fluctuations of tube 3 (and therewith the fluctuations of the position of seam portion 5).

Preferably, each seam interaction portion 55 is provided within the respective groove 51 and each seam interaction portion 56 is provided within the respective groove 52.

Advantageously, each surface profile of the respective seam interaction portion 55 differs from the surface profile of the respective seam interaction portion 56. In particular, by providing different surface profiles of the respective seam interaction portion 55 and the respective seam interaction portion 56 it is possible to control the different pressure profiles acting on the respective sealing bands 6a and 6b of the respective seal portion 30.

Preferentially, the surface profile of seam interaction portion 55 presents an undulated shape and the surface profile of seam interaction portion 56 presents an undulated shape differing from the undulated shape of the surface profile of seam interaction portion 55.

Figure 5:
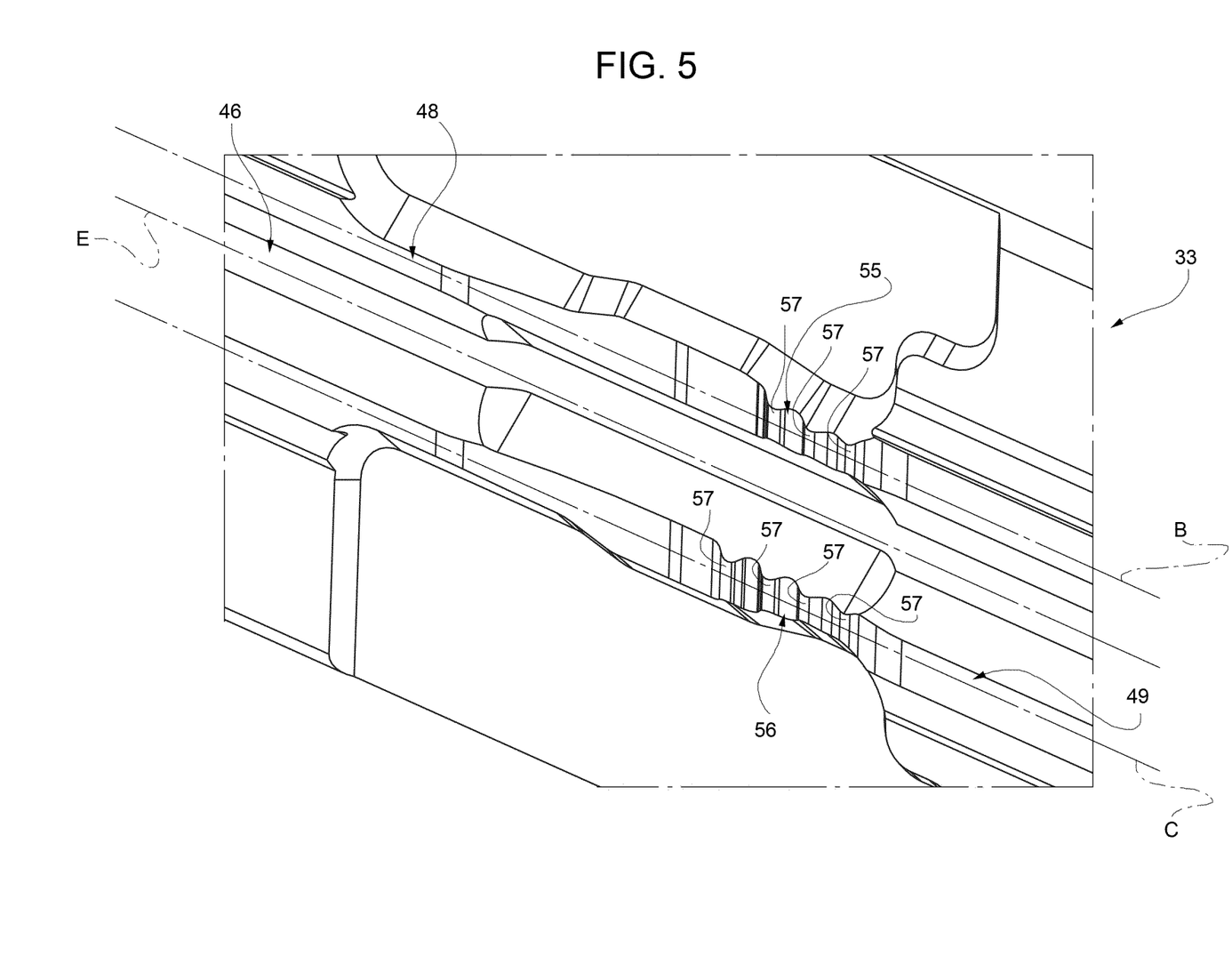
FIG. 5 is an enlarged perspective view of a detail of the anvil of FIG. 4, with parts removed for clarity.
Figure 6:
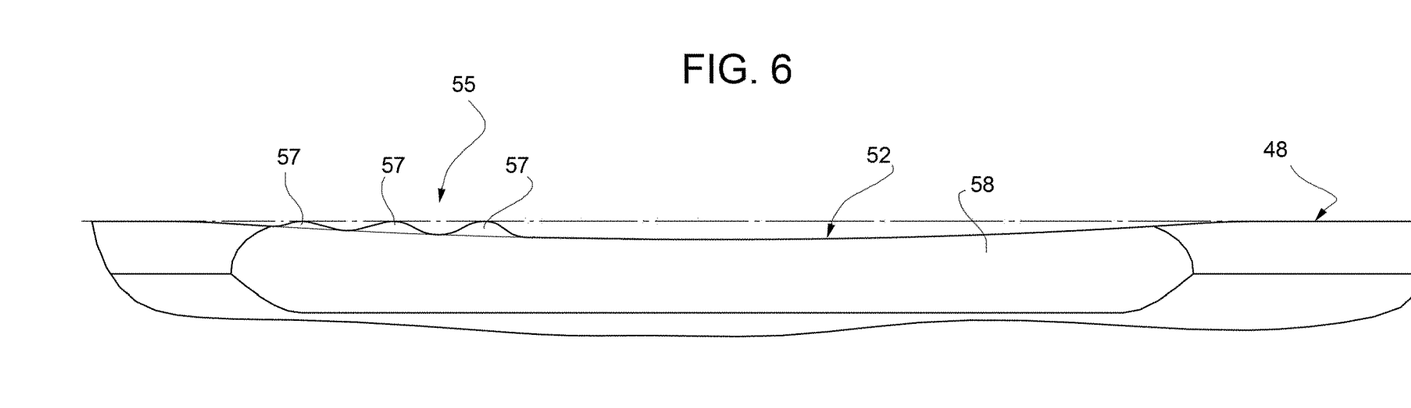
FIG. 6 is an enlarged side view of another detail of the anvil of FIG. 4, with parts removed for clarity.
Figure 7:
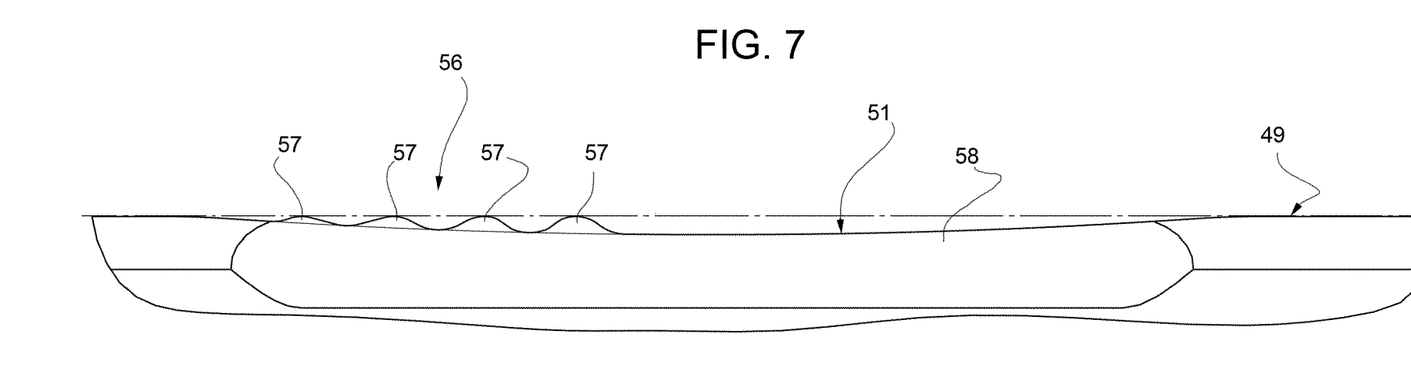
FIG. 7 is an enlarged side view of a further detail of the anvil of FIG. 4, with parts removed for clarity.

In more detail, each interaction portion 55 and each interaction portion 56 comprises, in particular consists of, a plurality of respective protrusions or teeth, in particular rounded protrusions 57 (see in particular FIGS. 5 to 7).

In particular, protrusions 57 have a hemisphere-like shape, even more particular protrusions 57 being substantially hemispheres.

Preferably, the respective protrusions 57 are arranged in the proximity of a first end zone of the respective groove 51 or the respective groove 52.

Even more preferably, the respective protrusions 57 are configured to interact, in use, with seam portion 5 in the proximity of the step between the three-layer arrangement of seal portion 30 and the two-layer arrangement of seal portion 30, even more particular, in the proximity of the step between the three-layer arrangement and the two-layer arrangement, which lies on the outer surface of the respective package 2 (see FIGS. 8 and 9).

Preferentially, the number of protrusions 57 of each seam interaction portion 56 is larger than the number of protrusions 57 of the respective seam interaction portion 55.

Preferably, seam interaction portion 56 comprises an even number of protrusions 57, in the specific example shown four. Even more preferably, seam interaction portion 56 comprises an even number of protrusions 57, in the specific example shown four, and seam interaction portion 55 comprises an uneven number of protrusions 57, in the specific example shown three.

Furthermore, the respective protrusions 57 of each seam interaction portion 55 and each seam interaction portion 56 are respectively linearly aligned to one another, in particular respectively along axis B and axis C.

Preferentially, protrusions 57 extend away from a base surface 58 of the respective groove 51 or the respective groove 52. In particular, the respective base surface 58 having a concave shape.

Preferably, each base surface 58 comprises a portion from which protrusions 57 extend away and a smooth portion. The smooth portion is arranged at a second end zone, opposite the first end zone, of the respective groove 51 or the respective groove 52.

In other words, each groove 51 and each groove 52 together with the respective protrusions 57 are asymmetrical with respect to an axis transversal, in particular perpendicular to respectively axis B and axis C.

With particular reference to FIGS. 6 and 7, protrusions 57 remain within the respective groove 51 or the respective groove 52, i.e. protrusions 57 do not extend out of the respective groove 51 or the respective groove 52 (indicated by the dashed line as shown in FIGS. 6 and 7). In other words, protrusions 57 are constrained within the respective groove 51 or the respective groove 52.

In particular, protrusions 57 protrude from respective base surface 58 to a height level being defined by the maximum extension of the respective auxiliary portion 53 and the respective auxiliary portion 54.

Preferably, the conveying device is adapted to advance anvils 33 and the respective ultrasonic horns 32 along respective conveying paths.

In particular, the conveying device is adapted to advance each anvil 33 and the respective first-half shell along the respective conveying path and the conveying device is adapted to advance each ultrasonic horn 32 and the respective second half-shell along the respective conveying path.

Even more particular, the conveying device is adapted to advance each first support member together with the respective anvil 33 and the respective first half-shell along the respective conveying path and the conveying device is adapted to advance each second support member together with the respective ultrasonic horn 32 and the respective second half-shell along the respective conveying path.

Preferentially, each one of the respective conveying paths comprises an operative portion at which each anvil 33 is adapted to cooperate with the respective ultrasonic horn 32 so as to compress tube 3 and to form the respective seal portion 30 and at which each first half-shell and the respective second half-shell are adapted to at least partially shape tube 3.

In particular, the conveying device comprises the cam mechanism (mechanical or electronically) adapted to interact with each one of the control assemblies so as to control the respective sealing jaws 29 into the sealing configuration with the respective anvil 33 and the respective ultrasonic horns 32 advancing along the operation portion of the respective conveying paths. The cam mechanism is also adapted to interact with each one of the control assemblies of the forming and sealing assemblies 28 so as to control the respective first half-shells and the respective second half-shells into the closed configuration when advancing along the operative portion of the respective conveying path.

In use, packaging apparatus 1 forms packages 2 filled with a pourable product. In particular, packaging apparatus 1 forms packages 2 from tube 3 formed from web 4, tube 3 being continuously filled with the pourable product.

In more detail, operation of packaging apparatus 1 comprises:
 a first advancement phase for advancing web 4 along path P;
 a tube forming and sealing phase during which web 4 is formed into tube 3 and tube 3 is longitudinally sealed, in particular along seam portion 5;
 a second advancement phase during which tube 3 is advanced along path Q;
 a filling phase during which the pourable product is continuously filled into tube 3; and
 a package forming phase during which packages 2 are formed from tube 3, in particular by shaping tube 3 and transversally sealing tube 3.

In further detail, the tube forming and sealing phase comprises the phase of gradually overlapping edges 19 and 20 with one another for forming seam portion 5 and the phase of longitudinally sealing tube 3, in particular seam portion 5.

The filling phase comprises the phase of directing the pourable product through filling pipe 27 into downstream space 48.

During the package forming phase packages 2 are formed by operation of package forming unit 16, which receives tube 3 after the tube forming and sealing phase. In particular, during the package forming phase, forming and sealing assembly 28 form packages 2.

In particular, during the package forming phase sealing jaws 29 are operated so as to compress tube 3, to form and heat the respective seal portions 30 and to cut the respective seal portions 30 between the respective sealing bands 6a and 6b so as to detach sealed packages 2 from tube 3. Furthermore, contemporarily the respective first half-shell and the respective second half-shell shape tube 3.

In more detail, during interaction of the respective sealing jaws 29 with advancing tube 3 also the respective sealing jaws 29 are advanced by the conveying device so as to follow advancement of tube 3.

In further detail, the respective anvils 33 and the respective ultrasonic horns 32 are controlled into their sealing positions so as to compress tube 3 and the respective ultrasonic horns 32 are activated so as to generate ultrasonic vibrations for heating the heat-seal plastic material.

In particular, during compression of tube 3 for forming seal portion 30 the respective section of seam portion 5 is arranged within the respective recess 50. Even more particular, the section of seam portion 5 is arranged within the respective groove 51 and the respective groove 52.

More specifically, the respective seam interaction portion 55 and the respective seam interaction portion 56 interact with the respective section of seam portion 5. As the respective surface profiles of the respective seam interaction portion 55 and the respective seam interaction portion 56 differ, the local pressures exerted onto the section of seam portion 5 differs as a function of the specific surface profiles.

Furthermore, during the package forming phase the conveying device advances the respective anvils 33 and the respective ultrasonic horns 32 along the respective conveying paths.

Preferentially, during the package forming phase, tube 3 is transversally cut between two successive packages 2, in particular along the respective seal portion 30, after or during transversal sealing of tube 3. In more detail, during the package forming phase, the respective cutting means, in particular the respective blade 34 transversally cuts tube 3, in particular along the respective seal portion 30, between two successive packages 2.

Preferentially, the respective control assembly, in particular through interaction with the cam mechanism, controls the respective anvil 33 and the respective ultrasonic horn 32 into the sealing position when the respective anvil 33 and the respective ultrasonic horn 32 advance along the respective operative portion of the respective conveying path. Simultaneously, the control assembly controls, in particular through interaction with the cam mechanism, the respective first half-shell and the respective second half-shell into the closed configuration. Furthermore, activation of the cutting means, in particular the respective cutting blade 34 leads to cutting the respective seal portion 30. Afterwards, the respective anvil 33 and the respective ultrasonic horn 32 are controlled into the rest position and the respective first half-shell and the second half-shell are controlled into the respective open configuration.

The advantages of anvil 33 according to the present invention and of sealing jaw 29 having anvil 33 will be clear from the foregoing description.

In particular, by providing each seam interaction portion 55 with a surface profile different from the surface profile of the respective seam interaction portion 56 it is possible to exert different pressures onto the respective sealing bands 6a and 6b of the respective seal portion 30. This allows to generate differing pressure profiles acting on sealing band 6b and on sealing band 6a.

Since sealing band 6a belongs to a first package and sealing band 6b belong to a second package, arranged downstream of first package along path Q, sealing band 6a and sealing band 6b are subjected to different sealing conditions during the sealing operation.

Owing to the invention, it is possible to take into account the above-mentioned different sealing conditions and compensate for the possible different behaviors of the portions of packaging material forming the sealing band 6a and the sealing band 6b.

In particular, the invention permits to improve the control of the temperatures within sealing band 6a and sealing band 6b during the sealing operation. In particular, it is possible to control the temperatures to reduce, or prevent, the formation of unwanted pinholes within sealing band 6a and to reduce, or prevent, the formation of channels within sealing band 6b.

Clearly, changes may be made to anvil 33 and accordingly to sealing jaw 29 as described herein without, however, departing from the scope of protection as defined in the accompanying claims.

The invention claimed is:

1. An anvil for transversally sealing a tube having a longitudinal seam portion configured to advance along a path, the anvil comprising:
    a first elongate contact surface extending along a first axis and adapted to contact the tube; and
    a second elongate contact surface spaced from the first elongate contact surface and extending along a second axis parallel to the first axis, the second elongate contact surface adapted to contact the tube;
    wherein the first elongate contact surface comprises a first groove and the second elongate contact surface comprises a second groove, each one of the first groove and the second groove being adapted to receive, in use, a respective section of the longitudinal seam portion of the tube;
    wherein the first elongate contact surface comprises a first seam interaction portion positioned within the first groove and having a first surface profile, the first seam interaction portion adapted to interact with a first respective section of the longitudinal seam portion;
    wherein the second elongate contact surface comprises a second seam interaction portion positioned within the second groove and having a second surface profile, the second seam interaction portion adapted to interact with a second respective section of the longitudinal seam portion; and
    wherein the first surface profile of the first seam interaction portion differs from the second surface profile of the second seam interaction portion.

2. The anvil according to claim 1, wherein the first surface profile is a first undulated surface profile and the second surface profile is a second undulated surface profile differing from the first undulated surface profile of the first surface profile.

3. The anvil according to claim 1, wherein the first seam interaction portion and the second seam interaction portion each comprises a plurality of protrusions defining the first and second surface profiles, and wherein the second seam interaction portion comprises more protrusions than the first seam interaction portion.

4. The anvil according to claim 3, wherein the plurality of protrusions of the first seam interaction portion and the plurality of protrusions of the second seam interaction portion have a rounded configuration.

5. The anvil according to claim 3, wherein the first seam interaction portion comprises an odd number of protrusions.

6. The anvil according to claims 3, wherein the second seam interaction portion comprises an even number of protrusions.

7. The anvil according to claim 3, wherein the plurality of protrusions of the first seam interaction portion and the plurality of protrusions of the second seam interaction portion are linearly aligned with one another.

8. The anvil according to claim 3, wherein each of the first groove and the second groove has a base surface, and wherein the plurality of protrusions extend from the base surface and are constrained respectively within the first groove and the second groove.

9. The anvil according to claim 8, wherein the base surfaces of the first groove and of the second groove are concavely shaped.

10. The anvil according to claim 1, wherein, in use, the first contact surface is upstream of the second contact surface along the path.

11. The anvil according to claim 1, wherein the anvil further comprises:
   a first ridge comprising the first contact surface;
   a second ridge comprising the second contact surface; and
   an elongated through-seat extending along a third axis parallel to the first axis and the second axis, wherein the elongated through-seat is adapted to house a cutting blade and and is positioned between the first ridge and the second ridge.

12. A sealing jaw for transversally sealing the tube of packaging material extending along a longitudinal axis and advancing along the path, the sealing jaw comprising:
   an ultrasonic horn adapted to generate an ultrasonic wave; and
   the anvil according claim 1;
   wherein the ultrasonic horn and the anvil are adapted to contact opposing sides of the tube and to form, in cooperation with one another, a transversal seal portion of the tube.

13. The sealing jaw according to claim 12, further comprising a cutting blade adapted to cut the tube along the transversal seal portion.

14. The sealing jaw according to claim 12, further comprising a control assembly adapted to move the ultrasonic horn and the anvil between a sealing position in which the ultrasonic horn and the anvil are configured to compress and seal the tube to form the transversal seal portion and a rest position in which the ultrasonic horn and the anvil are spaced from the tube.

* * * * *